(12) United States Patent
Choi et al.

(10) Patent No.: US 12,533,600 B2
(45) Date of Patent: Jan. 27, 2026

(54) SYSTEM, DEVICE, AND METHOD FOR CONTROLLING BITMAP TO DIRECT PERFORMANCE SCENE

(71) Applicant: FANLIGHT CO., LTD., Seoul (KR)

(72) Inventors: Kyung Il Choi, Seoul (KR); Jung Min Choi, Seoul (KR); Hyun Gil Kim, Seoul (KR)

(73) Assignee: FANLIGHT CO., LTD., Seoul (KR)

( * ) Notice: Subject to any disclaimer, the term of this patent is extended or adjusted under 35 U.S.C. 154(b) by 940 days.

(21) Appl. No.: 17/735,953

(22) Filed: May 3, 2022

(65) Prior Publication Data

US 2022/0258066 A1 Aug. 18, 2022

Related U.S. Application Data

(63) Continuation of application No. PCT/KR2021/005319, filed on Apr. 27, 2021.

(30) Foreign Application Priority Data

Feb. 10, 2021 (KR) .................. 10-2021-0018979

(51) Int. Cl.
*H05B 47/155* (2020.01)
*A63J 5/02* (2006.01)
*H05B 47/165* (2020.01)
*H05B 47/19* (2020.01)
*H04W 4/33* (2018.01)

(52) U.S. Cl.
CPC .............. *A63J 5/02* (2013.01); *H05B 47/155* (2020.01); *H05B 47/165* (2020.01); *H05B 47/19* (2020.01); *H04W 4/33* (2018.02)

(58) Field of Classification Search
CPC ......... A63J 5/02; H05B 47/19; H05B 47/155; H05B 47/165; H04W 4/33
See application file for complete search history.

(56) References Cited

U.S. PATENT DOCUMENTS

| 7,697,925 | B1 | 4/2010 | Wilson et al. | |
| 2019/0394860 | A1* | 12/2019 | Choi | .............. H05B 47/1985 |
| 2020/0337143 | A1* | 10/2020 | Jo | .................. H05B 47/155 |

FOREIGN PATENT DOCUMENTS

| CN | 110896612 A | 3/2020 |
| JP | 2015-011981 A | 1/2015 |
| JP | 2023517163 A | 4/2023 |
| KR | 10-2006-0033563 A | 4/2006 |
| KR | 10-1214235 B1 | 12/2012 |
| KR | 101970358 B1 | 4/2019 |
| KR | 10-2019-0070220 A | 6/2019 |

(Continued)

*Primary Examiner* — Henry Luong
(74) *Attorney, Agent, or Firm* — Dinsmore & Shohl LLP; Yongsok Choi, Esq.

(57) ABSTRACT

The inventive concept includes a control console device to generate and transmit a data packet for a light emitting operation for each production scene for a performance, and a plurality of light emitting devices to receive the data packet from the control console device and to perform the light emitting operation in the data packet. The light emitting device emits light in a first color corresponding to first group information for a first production scene, which is contained in the data packet, based on group information for each production scene which is previously stored.

11 Claims, 10 Drawing Sheets

(56) References Cited

FOREIGN PATENT DOCUMENTS

| | | |
|---|---|---|
| KR | 10-2020-0123735 A | 10/2020 |
| KR | 10-2021-0035106 A | 3/2021 |
| WO | 2020004735 A1 | 1/2020 |

* cited by examiner

FIG. 2

| COLOR NUMBER INFORMATION | 0 | 1 | 2 | 3 | 4 | 5 | 6 | 7 |
|---|---|---|---|---|---|---|---|---|
| COLOR INFORMATION | 255,255,255 WHITE | 255,0,0 RED | 255,50,0 SCARLET | 255,255,0 YELLOW | 0,255,0 GREEN | 0,0,255 BLUE | 0,5,255 NAVY BLUE | 100,0,255 VIOLET |

FIG. 3

| COLOR NUMBER INFORMATION | 0 | 1 | 2 | 3 | CORRECTION RANGE VALUE |
|---|---|---|---|---|---|
| REFERENCE COLOR TO BE CORRECTED | 250,250,250 WHITE | 250,5,5 RED | 5,250,5 GREEN | 5,5,250 BLUE | ±5 |
| CORRECTION RANGE FOR EACH ERROR | 245,245,245~255,255,255 | 245,0,0~255,10,10 | 0,245,0~10,255,10 | 0,0,245~10,10,255 | |

SYSTEM, DEVICE, AND METHOD FOR CONTROLLING BITMAP TO DIRECT PERFORMANCE SCENE

CROSS-REFERENCE TO RELATED APPLICATIONS

The present application is a continuation of International Patent Application No. PCT/KR2021/005319, filed on Apr. 27, 2021, which is based upon and claims the benefit of priority to Korean Patent Application No. 10-2021-0018979 filed on Feb. 10, 2021. The disclosures of the above-listed applications are hereby incorporated by reference herein in their entirety.

BACKGROUND

Embodiments of the inventive concept described herein relate to a system, a device, and a method for controlling a bitmap, capable of creating a performance scene in a performance hall.

In general, a light emitting device (or lighting device) refers to a light emitting device that reflects, refracts, and transmits light from a light source to achieve the purpose of lighting. The light emitting device may be classified into an indirect light emitting device, a semi-indirect light emitting device, a general diffuse light emitting device, a semi-direct light emitting device, and a direct light emitting device according to light distribution.

With the development of a technology, the light emitting device has been used in various purposes. For example, the light emitting device is used to produce a media facade. The media facade refers to implementing a media function by installing the light emitting device on an outer wall of a building.

For another example, the light emitting device may be used as a small cheering tool in sports events or concerts held under an environment having a specific illuminance or less. However, since a plurality of light emitting devices are individually controlled under the environment, it is difficult to produce a systematic pattern or shape.

Meanwhile, although novel performance production is expected in a performance hall for sports events and concerts every time, since the performance hall are mainly filled with seats, it is difficult to produce the media facade using the light emitting devices in a space other than the seats.

Therefore, to solve the above problems in detail, it is necessary to introduce a method of integrally controlling a plurality of light emitting devices and producing various shows in a performance hall for a sports event or a concert.

SUMMARY

To solve the above problem, one light emitting device may be designated as one pixel in a bitmap and a plurality of light emitting devices may be controlled in a manner of controlling the pixel in the bitmap, when the performance is produced in the performance hall.

In addition, according to the inventive concept, when the performance is produced in the performance hall, the data packet is transmitted to the light emitting device from the control console device in real time, thereby changing the light emitting state of the light emitting device in real time.

Problems to be solved by the inventive concept are not limited to the problems mentioned above, and other problems not mentioned will be clearly understood by those skilled in the art from the following description.

To accomplish the above object, according to the inventive concept, a control console device is provided to generate and transmit a data packet for a light emitting operation for each production scene for a performance, and a plurality of light emitting devices are provided to receive the data packet from the control console device and to perform the light emitting operation in the data packet. The light emitting device may emit light in a first color corresponding to first group information for a first production scene in the data packet, based on group information for each production scene which is previously stored.

In this case, the data packet may include at least one of at least one of index information including some group information constituting the first production scene, color palette information including color information for representing the first production scene, and some group information including color number information for each of the some group information constituting the first production scene.

In addition, the index information may include position information of the first group information, which is contained in the data packet, of some group information constituting the first production scene.

The light emitting device may determine number information of a first color, which corresponds to the first group information of the some group information, based on the position information of the first group information, determine the first color information, which corresponds to the first color number information, of the color palette information, and emit light in the first color corresponding to the determined first color information.

The control console device may change similar colors, which are in each of whole production scenes, into one unified color, may apply a dithering scheme to each of the whole production scenes unified in one color, to reduce the size of the color palette information.

In addition, the control console device may synchronize a first data packet including the index information and the some group information for the first production scene, and a second data packet including the color palette information with each other and transmit the synchronization result.

The light emitting device for a cheering rod may temporarily store first color palette information in the received data packet, and update the first color pallet information with the second color palette information, when the second color palette information in the received data packet is different from the previously stored first color palette information.

In addition, to accomplish the above objects, according to the inventive concept, a light emitting device to produce a production scene may include a communication unit to communicate with a control console device, a light emitting unit to emit light using a light source, a storage unit to store data, and a control unit to control the operation of the light emitting device. The control unit may control the light emitting device to emit light in a first color corresponding to first group information for a first production scene in a data packet received from the control console device through the communication unit, based on group information for each production scene which is stored in the storage unit.

In addition, to accomplish the above objects, according to the inventive concept, a control console device to produce a performance scene may include a communication unit to communicate with a light emitting device, a storage unit store data, and a control unit to generate a data packet for a light emitting operation of the light emitting device with respect to each production scene. The control unit may synchronize a first data packet including the index information and the some group information for the first production scene, and a second data packet including the color palette information with each other and transmit the synchronization result.

In this case, the data packet may include at least one of index information including some group information constituting the first production scene, color palette information including color information for representing the first production scene, and some group information including color number information for each of the some group information constituting the first production scene.

Besides, another method and another system for implementing the inventive concept, and a computer-readable recording medium having a computer program to execute the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 2 is a view illustrating color information for each number information of a color stored in a master, according to the inventive concept;

FIG. 3 is a view illustrating information on a reference color range for color information of a color palette stored in a master, according to the inventive concept;

DETAILED DESCRIPTION

Figure 1:
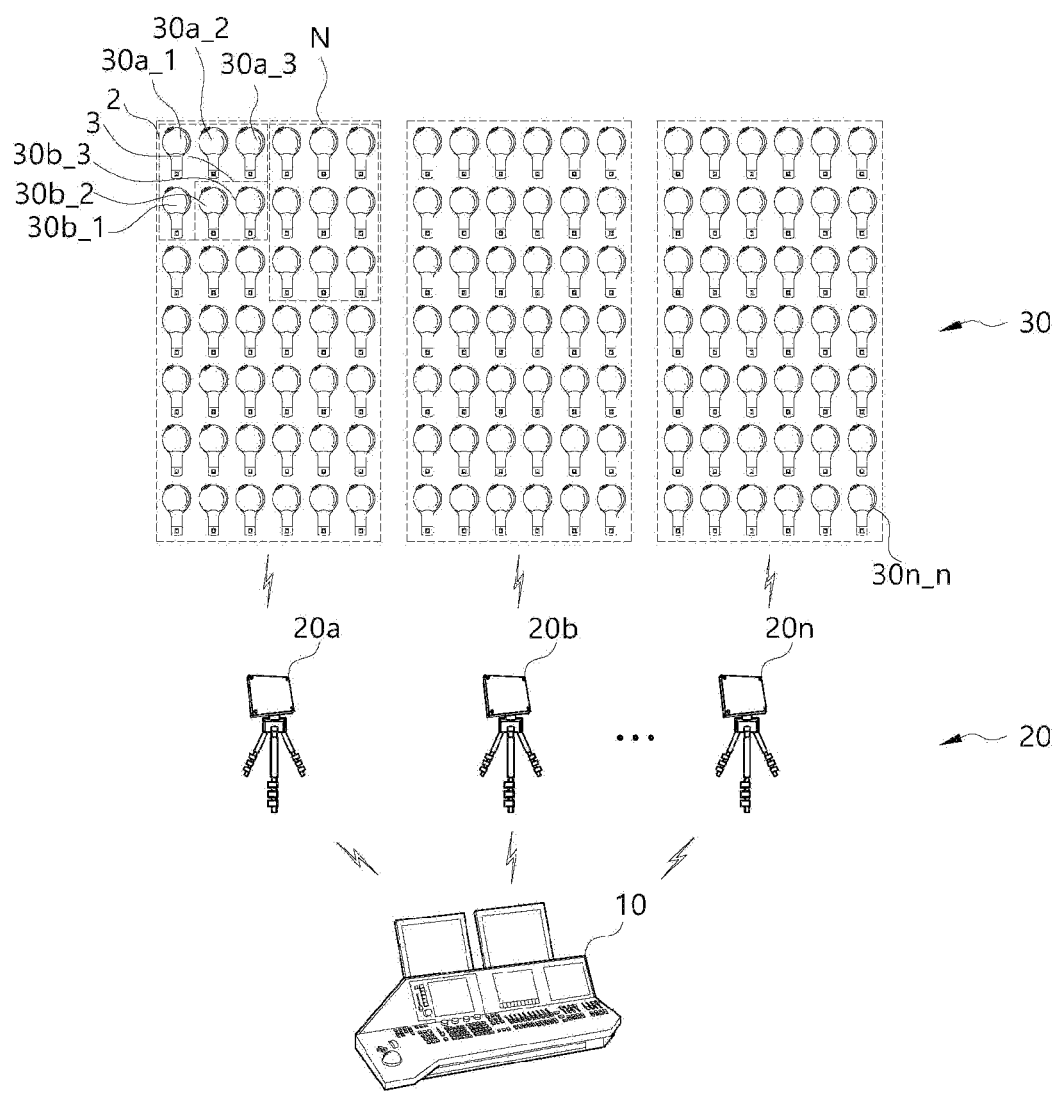
FIG. 1 is a view schematically illustrating the configuration of a system for producing a performance scene in a performance hall, according to the inventive concept.

The above and other aspects, features and advantages of the inventive concept will become apparent from embodiments to be described in detail in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

The term "exemplary" is used with the meaning of an "example", or "used for the illustrative purpose". In the inventive concept, a predetermined embodiment described as being "an exemplary embodiment" should not be interpreted as being "a preferred embodiment" or "an embodiment advantageous more than other embodiments"

The term "unit" used herein may refer to software or hardware such as field programmable gate array (FPGA) or application specific integrated circuit (ASIC), and the "unit" may perform some functions. However, the "unit" may not be limited to software or hardware. The "unit" may be configured to exist in an addressable storage medium or may be configured to reproduce one or more processors. Therefore, as an example, "units" may include various elements such as software elements, object-oriented software elements, class elements, and task elements, processes, functions, attributes, procedures, subroutines, program code segments, drivers, firmware, micro-codes, circuits, data, databases, data structures, tables, arrays, and variables. Functions provided in "units" and elements may be combined into a smaller number of "units" and elements or may be divided into additional "units" and elements.

In addition, in the present specification, all "units" may be controlled by at least one processor, and the operation performed by the "unit" of the inventive concept may be performed by at least one processor.

Embodiments of the present specification will be described in terms of a function or a block performing the function. The block designated as a "unit" or "module" in the inventive concept may be mechanically implemented with an analog circuit or a digital circuit, such as a logic gate, an integrated circuit, a micro-processor, a micro-controller, a memory, a passive electronic part, an active electronic part, an optical component, a hardwired circuit, and may be selectively driven by firmware and software.

An embodiment of the present specification may be implemented by using at least one software program executed on at least one hardware device and may perform a network management function of controlling an element.

Unless otherwise defined, all terms (including technical and scientific terms) used herein have the same meaning as commonly understood by those skilled in the art to which the inventive concept pertains. Also, the terms that are defined in commonly used dictionaries should not be interpreted in an idealized or overly formal sense unless expressly so defined herein.

Spatially relative terms, such as "below", "beneath", "lower", "above", "upper", and the like, may be used herein to make it easier to describe the relationship between one component and another component. It will be understood that the spatially relative terms are intended to encompass different orientations of the components in use or operation in addition to the orientation depicted in the figures. For example, when a component illustrated in accompanying drawings is reversed, a component provided 'below' or 'beneath' another component may be placed 'above' another component. Accordingly, the term "below" may include both concepts of "below" and "above. A component may be oriented in a different direction. Accordingly, terminology having relatively spatial concepts may be variously interpreted depending on orientations.

Hereinafter, an embodiment of the inventive concept will be described in detail with reference to accompanying drawings.

FIG. 1 is a view schematically illustrating the configuration of a system 1 for producing a performance scene in a performance hall, according to the inventive concept.

FIG. 2 is a view illustrating color information for each number information of a color stored in a master, according to the inventive concept.

FIG. 3 is a view illustrating information on a reference color range for color information of a color palette stored in a master, according to the inventive concept.

Figure 4:
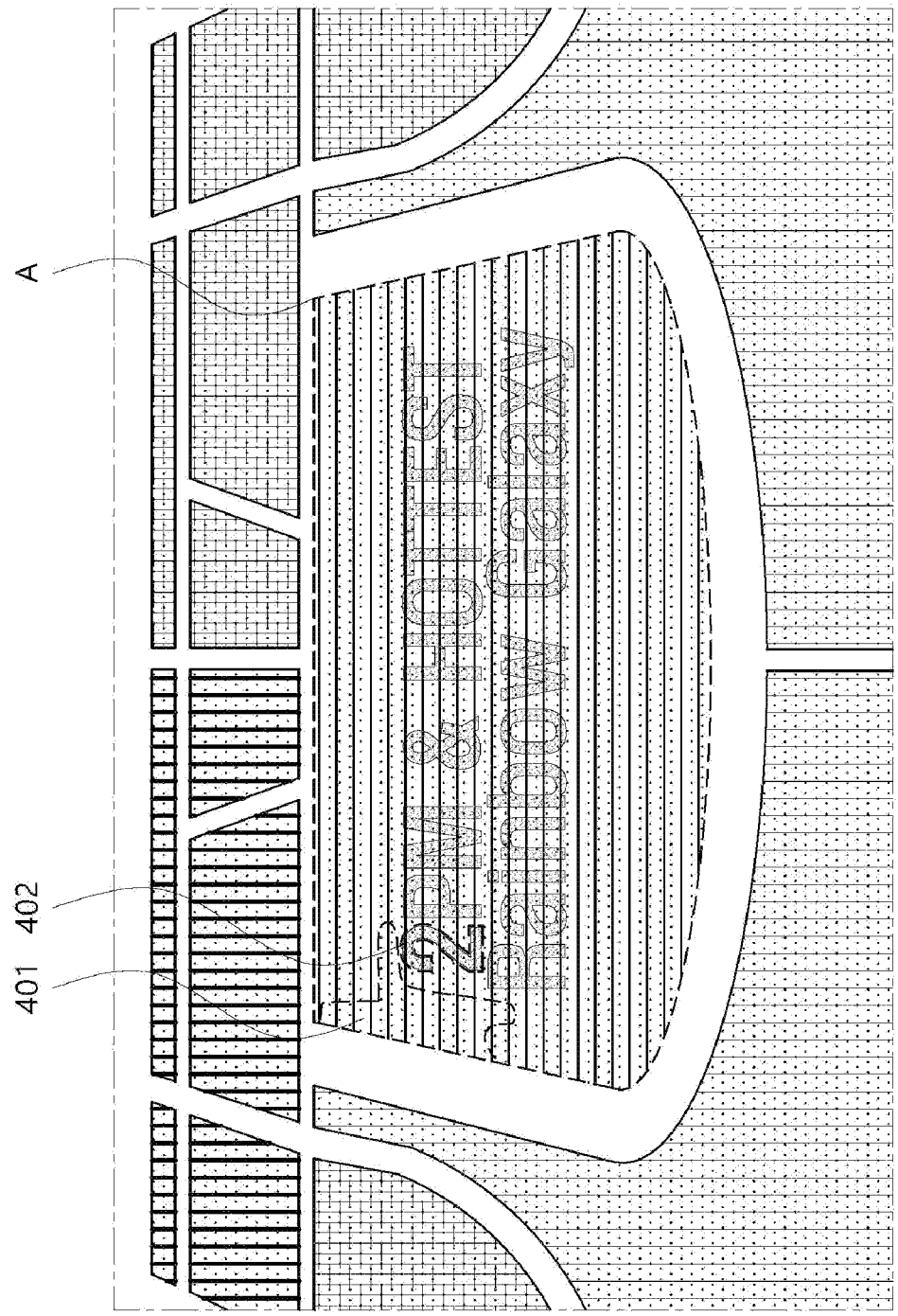
FIG. 4 is an exemplary view illustrating a performance producing effect exhibited on an audience seat in a performance hall according to the inventive concept.

FIG. 4 is an exemplary view illustrating a performance producing effect exhibited on an audience seat in a performance hall according to the inventive concept.

First, referring to FIG. 1, a system 1 (hereinafter, referred to as a "performance producing system") for producing a performance scene in a performance hall according to the inventive concept may include a control console device 10, transmitters 20a, 20b, . . . , and 20n, and light emitting devices 30a_1, . . . , and 30a_n, 30b_1, . . . , and 30b_n, . . . and 30n_1, . . . , and 30n_n (hereinafter, collectively referred to as '30'). In this case, the performance hall refers to a performance hall, such as a sports stadium or a performance hall, and may refer to a place in which a performance, such as an athletic event or a concert, is actually performed. In this case, the performance producing system 1 may include components smaller than or larger than components illustrated in FIG. 1.

In more detail, the performance producing system 1 may include the control console device 10, which generates and transmits a data packet for a light emitting operation, with respect to each scene produced for a performance, the transmitter 20, which transmits the data packet received from the control console device 10, and the plurality of light emitting devices 30 which receive the data packet, which is generated from the control console device 10, through the transmitter 20 and performs a light emitting operation in the data packet.

The performance producing system 1 may produce various light emitting patterns for producing a performance, such as cheering, in an audience seat of the performance hall, by controlling the light emitting state of the light emitting device 30.

Accordingly, the performance producing system 1 may designate one light emitting device as one pixel in the bitmap, and may control the plurality of light emitting devices 30 in a manner of controlling the pixel in the bitmap, when the performance is produced in the performance hall, thereby providing the scene effectively produced.

In addition, the performance producing system 1 may transmit the data packet to the light emitting device 30 from the control console device 10 in real time, thereby changing the light emitting state of the light emitting device 30 in real time when the performance is produced in the performance hall. Accordingly, various production scenes may be provided depending on situations.

According to the inventive concept, the control console device 10 may control the light emitting device 30 to produce performance in the performance hall. For example, the control console device 10, which is one of electronic devices, such as a cellular phone, a smart phone, a laptop computer, a digital broadcasting terminal, a personal digital assistants (PDA), a portable multimedia player (PMP), a navigation, a slate PC, a tablet PC, an ultrabook, a wearable device, such as a smartwatch, a smart glass, and a head mounted display (HMD), may include all electronic devices to install and execute an application related to one embodiment, may include some of components of the electronic device, or may be provided in various forms that is able to internetwork with the some components.

In addition, the control console device 10 may be one of an electronic device, such as MA Lighting grandMA2, grandMA3, ETC EOS, ETC ION, ETC GIO, Chroma Q Vista, High End HOG, High End Fullboar, Avolites Sapphire Avolites Tiger, Chamsys MagicQ, Obsidian control systems Onyx, Martin M6, Martin M1, Nicolaudie Sunlite, ESA, ESA2, Lumidesk, SunSuite, Arcolis, Daslight, LightRider, MADRIX, DJ LIGHT STUDIO, DISCO-DESIGNER VJ STUDIO, Stagecraft, or Lightkey, and software for a PC.

In addition, the control console device 10 may include appropriate software or an appropriate computer program which is able to control the light emitting device 30. For example, an exemplary protocol for controlling the light emitting device 30 may include DMX512, RDM, Art-Net, sACN, ETC-Net2, Pathport, Shownet, or KiNET. The control console device 10 may transmit a data signal (for example, a data packet) in an appropriate format, such as DMX512, Art-Net, sACN, ETC-Net2, Pathport, Shownet, or KiNET. The control console device 10 may generate a data packet for controlling the light emitting device 30 or may transmit the data packet to the light emitting device 30.

In addition, a master device (not illustrated) may receive the data packet generated from the control console device 10 and transmit the received data packet to the transmitter 20, and the transmitter 20 may transmit the data packet to the light emitting device 30 in the performance hall using wireless communication (for example, RF communication).

According to an embodiment, the master device (not illustrated) may be omitted, and the control console device 10 may directly transmit the data packet to the transmitter 20 and the transmitter 20 may transmit the data packet to the light emitting device 30.

The control console device 10 may include a plurality of input/output ports. The control console device 10 may include an input/output port corresponding to or related to a specific data signal format or protocol. For example, the control console device 10 may include a first port dedicated to DMX512, or RDM data input/output, and a second port dedicated to Art-Net and sACN, ETC-Net2, Pathport, Shownet, or KiNET input/output.

In this case, DMX512, RDM, Art-Net, sACN, ETC-Net2, Pathport, Shownet, and KiNET protocols are widely known as control protocols for stage lighting equipment. According to the inventive concept, control protocols such as DMX512, Art-Net, sACN, ETC-Net2, Pathport, Shownet, and KiNET may allow more flexible control plans for the light emitting device 30.

The control console device 10 may receive and store data for producing performance from another device (for example, a data generating device) in advance. In this case, the performance producing data may include information on a scene produced during a performance time, depending on a seating chart of the performance. In this case, the seating chart of the performance may be matched to the arrangement of the light emitting device 30.

In addition, the control console device 10 may overlay each scene of a moving picture on the arrangement of the light emitting device 30, reproduce the scene, extract a value of a portion, in which each light emitting device 30 is positioned, generate a data packet based on the value, and transmit the data packet to the light emitting device 30.

In this case, the moving picture is stored in a YUV format (which is the format supported even for a black-and-white TV), instead of the format of R, G, B which are values expressed in a computer monitor and the control console device 10 and have 8 bits each. Accordingly, a manner of displaying a color to be expressed through the light emitting device 30 by the control console device 10 and in the number of colors to be expressed through the light emitting device 30 by the control console device 10, may be changed.

In other words, as an original moving picture (a moving picture to be reproduced through the light emitting device 30) having the RGB format is transformed into the YUV (YCbCr) format (that is, as the original video having the RGB color is encoded in a video format of MP4, MPG, MOV, or AVI), information may be lost.

In detail, a value corresponding to a value present in 24-bit RGB color coordinates may be absent from YUV color coordinates, and the values may differ from each other in color gamut. When a transformation formula (see ITU-R BT.601) is applied to the values, information may be lost due to the difference in color gamut. When the color expression of 256 levels of 24-bit RGB is transformed to the color expression of YUV (having the bit rate of 8 bits), 225 levels are obtained to cause an error (quantization error). The rate of the error may be 13.78%. When the transformed image having 225 levels in the YUV format is attempted to be recovered to an image having 256 levels of 24-bit RGB, a quantization unit (quantization error) is mismatched between the images to cause an error. The rate of the error may be 12.11%. Accordingly, the accumulated error rates may be about 1.67%, when transformation is repeatedly made between the RGB format and the YUV format. In this case, when 1.67% is converted into the size of a value causing the error, 4.28 may be obtained, and rounded off to '5'. Accordingly, when the original value is 5, and when it is assumed that the maximum error is caused, a value transformed to be in the YUV format and recovered to be in the RGB format may have an error in the range of '0 (−5)' to '10 (+5)'. The error may be changed depending on a transformation formula (for example, formula in each standard of ITU-R BT.601, ITU-R BT.656, or ITU-R BT.1120).

Therefore, when encoding an original 24-bit RGB moving picture, which is matched to the intent of a producer, to a YUV moving picture, at a higher compression level, the control console device 10 merges and processes adjacent pixels. Accordingly, the adjacent pixels are influenced on each other to cause an error. In other words, the color intended by the producer may be output to a different color having an error. In detail, a pixel value may be differently interpreted depending on an encoding format, a bit rate, and a resolution of an image, and a value of the adjacent pixel, in every transformation, and stored in the image in the state that the pixel value is lost and compressed. Accordingly, it is difficult to recover the pixel value to be in the original state.

For example, when a part, which is marked in red (having the color coordinates of 255, 0, 0 when expressed in the RGB format), of an original image is designated as color gamut #0, regarding a value recovered to the RGB value after encoded to the YUV value, the recovered red (having the color coordinates of 250, 4, 5 when expressed in the RGB format) may be expressed different from the original red. In other words, the recovered red is not exactly expressed as red in the original image, but discolored.

Accordingly, a master (not illustrated) may receive a data packet, which is generated based on the moving picture, from the control console device 10, and may correct color information of a color palette having an error included in the data packet, based on reference color range information which is previously stored.

First, the master may store, in advance, multiple pieces of color information, which is previously defined, with respect to the moving picture. In this case, the multiple pieces of color information, which is previously defined, may be, for example, four pieces of color information which is previously defined.

For example, the master may produce one scene of the moving picture based on the multiple pieces of previously-defined color information, or may produce the scene based on multiple pieces of novel color information on colors randomly changed by a producer while maintaining the form of the scene as being previously produced. Accordingly, various atmospheres may be produced even for a scene having the same form, depending on the color difference.

In detail, the master may store color information with respect to each color number information, as illustrated in FIG. 2.

In this case, the color number information may be expressed ranging from '0' to '15'. The color information for each color number information may be expressed as an RGB value. For example, when the color number information is '0', the color information represents '255,255,255 (white)'. When the color number information is '1', the color information represents '255, 0, 0 (red)'.

Thereafter, when the master receives the data packet based on the moving picture from the control console device 10, the master may correct color information of a color palette having an error included in the data packet, based on reference color range information which is previously stored.

In detail, referring to FIG. 3, the master may store reference color range information, which is previously stored, for color information of a color palette in advance. For example, when the color number information is '0', and when a reference color (that is, a reference color to be corrected for an error), which is to be interpreted, is '250, 250, 250 (white)', the correction range for each error may be in the range of '245,245,245' to '255,255,255' (when the correction range is reflected). In this case, the correction range may be in the range −5 to +5 with respect to the reference color to be corrected for the error.

For example, when the color information of the color palette having an error in the data packet received from the control console device 10 is, as '246,247,248', in included in the range of '245,245,245' to '255, 255,255', the master determines the data packet as being received with '250, 250, 250 (white)', and interprets the color number information as '0'. Accordingly, the relevant group of the light emitting devices 30 may emit light having '255,255,255 (white)' which corresponds to a color of '0' in the color palette of FIG. 2.

For another example, referring to FIG. 3, the master may store a reference color of '5, 250, 5 (green)' and a correction error range value of −5 to +5 with respect to color number information of '2'. In this case, when receiving a data packet including '3, 247, 7 (a value erroneously transformed in the RGB transform of a moving picture reproduced in a console, even though green is intended)' which is color information of the color palette, from the control console device 10, since the color information of '3, 247, 7' is confirmed to be within the range of '0, 245, 0' to '10, 255, 10', the master determines the reference color of 5, 250, 5 (green) as being received, and interprets the color number information as the value of '2', and allows the relevant group of light emitting devices 30 to emit light having '255, 50, 0 (scarlet)' corresponding to the color number information of '2' in the color palette of FIG. 2.

According to the above effect, the master (not illustrated) may correct an error based on the reference color range information, which is previously stored, even if the control console device 10 receives color information having an error, instead of intended color in the original moving picture. Accordingly, the producer may have a desired production effect.

In addition, according to the inventive concept, the transmitter 20, which is a communication device such as an antenna, may transmit a data packet, which is received from the control console device 10, to the light emitting device 30. The transmitter 20 may receive a data packet for controlling the light emitting of the light emitting device 30 from the control console device 10 and may transmit the data packet to the light emitting device 30.

Although the transmitter 20 is disclosed as a device separate from the control console device 10, the control console device 10 may include a communication module to perform the same function as that of the transmitter 20. Accordingly, when the control console device 10 includes the communication module, the control console device 10 may perform the same function as that of the transmitter 20, and the light emitting device 30 may emit light by receiving the data packet from the control console device 10.

In this case, the transmitter 20 may have directivity, and a performance planner may place the transmitter 20, at the stage of planning a performance based on the specifications of a transmitter to be used. However, light emitting devices positioned at some seats may receive data packets transmitted from mutually different transmitters due to mechanical and technical limitations of the transmitter 20. In more detail, the light emitting devices positioned at some seats may repeatedly receive mutually different data packets from at least two transmitters. Accordingly, the light emitting device 30 may not determine a relevant data packet to emit light. However, the light emitting device 30 may correctly determine the relevant data packet within a limited wireless bandwidth. Accordingly, the light emitting device 30 may receive a data packet based on identification information of the transmitter. In addition, the control console device 10 may transmit a data packet to each transmitter 20 to reduce the influence on noise to the maximum, thereby exhibiting a performance producing effect different from that of an existing performance.

In addition, the transmitter 20 may transmit the data packet to the light emitting device 30 by the preset number of times. In general, most signals transmitted by the transmitter 20 may be one-time signals. However, since a performance hall has numerous signals mutually different from each other, signals other than the data packet may serve as noise in producing a performance. The noise may interrupt the data packet from being correctly transmitted to the light emitting device 30. Accordingly, as the transmitter 20 transmits the data packet to the light emitting device 30 by the preset number of times (for example, five times for one data packet), the light emitting device 30 may correctly receive the data packet.

In addition, according to the inventive concept, the light emitting device 30 may perform the function of producing various light emitting patterns in real time or depending on preset data packets, by the control console device 10.

In this case, the light emitting device 30 may include a light emitting element/device, such as an LCD or an LED, or include an arbitrary electronic device connected to the light emitting element/device and allowing wireless communication, and may be a small cheering tool held by the audience at a stadium or concert. According to an embodiment, the light emitting device 30 may include a cellular phone, a wireless cheering stick, a lighting stick, a lighting bar, a lighting ball, a lighting panel, and an instrument to which a wirelessly controllable light source is attached.

In addition, the light emitting device 30 may be referred to as a lighting device, a receiver, a controlled device, a slave, and a slave lighting device. In addition, the light emitting device 30 may include a wearable device that may be attached to and/or worn on a part of the body, such as a wrist and a chest, of a user.

As illustrated in FIG. 1, a light emitting device 30a_1, a light emitting device 30a_2, a light emitting device 30a_3, and a light emitting device 30b_1, which are included in a first group 2, may emit light in a first color corresponding to first group information for a first production scene, which is contained in the data packet received from the transmitter 20a, a light emitting device 30b_2, and a light emitting device 30b_3, which are included in a second group 3, may emit light corresponding to a color included in second group information for the first production scene, which is contained in the data packet received from the transmitter 20a.

In this case, the first group 2 to an N-th group N may refer to groups of light emitting devices having identification information of the same transmitter 20a. Accordingly, the number of light emitting devices included in each group may be different for each group. The first group 2 to the N-th group N may be classified while being defined as pixels in a bitmap, based on information on seats in a performance hall and the intent of a performance planner, on the assumption that the light emitting devices 30 are positioned at the seats.

According to the inventive concept, the transmitter 20 may have directivity. The performance planner may arrange the transmitter 20 at the stage of planning the performance, based on the specification of the transmitter used in the corresponding performance. Accordingly, the light emitting device 30 may receive a data packet from the transmitter 20 having identification information matched to the identification information of a transmitter stored in the light emitting device 30 in advance.

Next, referring to FIG. 4, the performance producing system 1 may define the light emitting device 30, which is positioned to correspond to each seat in the performance hall, as one pixel, and may exhibit the effect of producing the performance by using the light emitting device 30.

The control console device 10 may receive and store data, which is used for producing the performance, from another device (e.g., a data generator) in advance, or may be received through another storage medium or another transmission medium. In addition, the control console device 10 may receive the data for producing the performance data in real time during the performance and may generate a data packet corresponding to the data.

In this case, the data for producing the performance may include control information for each scene which is produced during the performance. In more detail, the data for producing the performance may be data constituting a performance scene during for performance producing duration, depending on the production scene to be produced by using the light emitting device 30 during the time of the performance performed in the performance hall The control console device 10 may generate a data packet for controlling the bitmap of the light emitting device 30, based on the data for producing the performance, which is received from a data generator (not illustrated).

For example, the control console device 10 may generate a data packet for a first production scene (e.g., a first scene) during a first performance producing duration (for example, a first time), and may generate a data packet for an n-th production scene (for example, an n-th scene) during an n-th performance producing section (for example, an n-th time)

Therefore, when audience seats are formed in a performance hall as illustrated in FIG. 4, the first production scene is produced to be expressed in colors, which are varied depending on the audience seats, together with a specific text as illustrated in FIG. 4. In addition, the n-th production scene may be produced in the form of a scene different form the first producing scene. For example, the n-th production scene may be produced in a specific shape and a specific pattern.

When the control console device 10 controls the light emitting device 30 in the form of a bitmap, the control console device 10 may bind light emitting devices 30 variously depending on the production scenes to form various groups, and may produce various production scenes through the light emitting devices 30 bound in various forms depending on the groups.

For example, when transmitting a data packet to the light emitting devices 30 positioned in one zone 'A', the data packet may include whole group information including first group information to n-th group information to produce the first production scene for the zone 'A'.

In this case, the light emitting devices 30, which constitute a first group 401 corresponding to the first group information, emit light in the first color to express number '2' which is a first text. In addition, the light emitting devices 30, which constitute a second group 402 corresponding to the second group information, emit light in the second color to the background of number '2', which is a second text.

Figure 5:
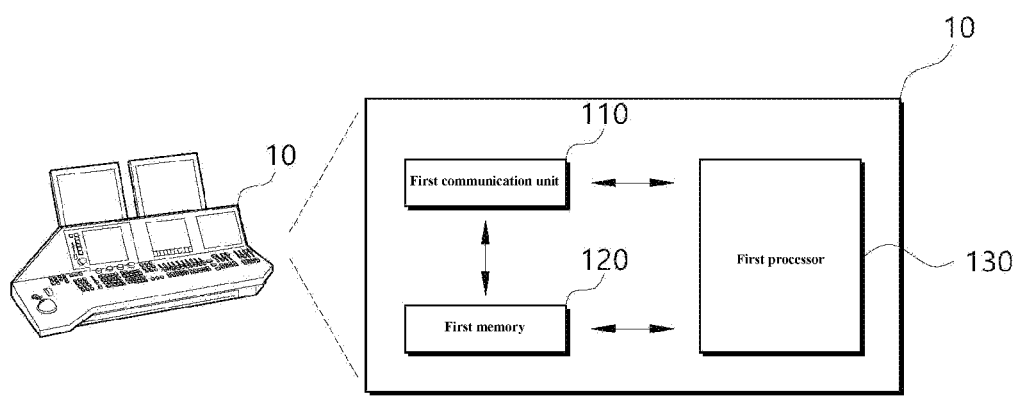
FIG. 5 is a block diagram illustrating the configuration of a control console device according to the inventive concept.

FIG. 5 is a block diagram illustrating the configuration of the control console device 10, according to the inventive concept.

Figure 6:
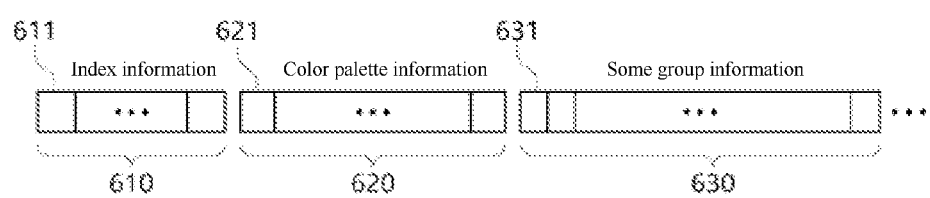
FIG. 6 is a view illustrating a data packet generated from a control console device, according to the inventive concept.

FIG. 6 is a view illustrating a data packet generated from the control console device 10, according to the inventive concept.

Figure 7:
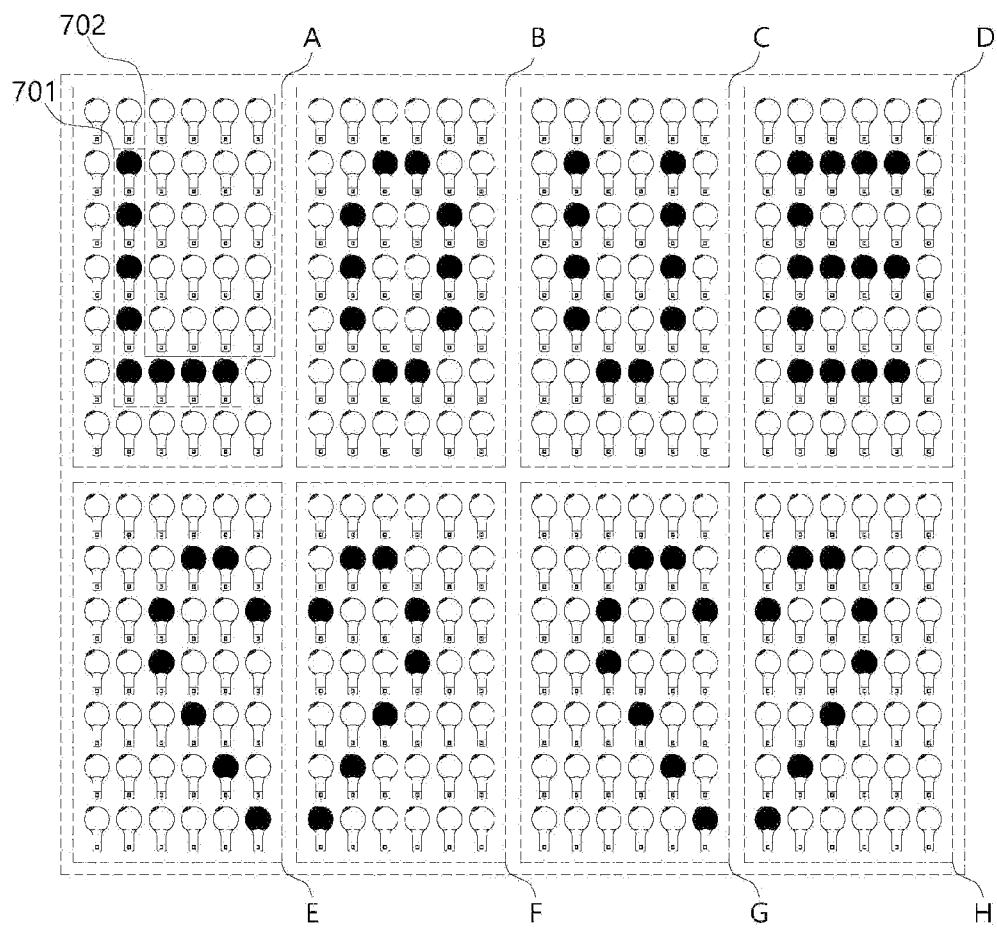
FIG. 7 is a view illustrating a first production scene, according to the inventive concept.

FIG. 7 is a view illustrating a first production scene, according to the inventive concept.

Figure 8:
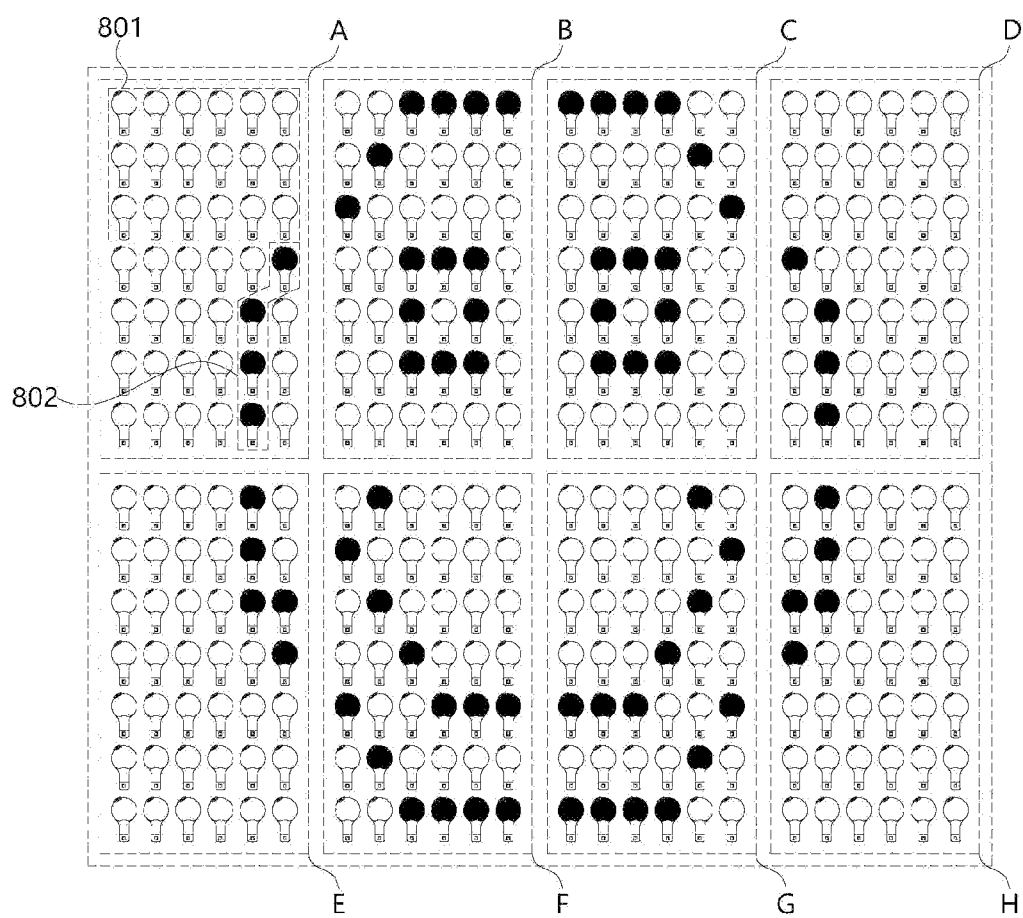
FIG. 8 is a view illustrating a second production scene, according to the inventive concept.

FIG. 8 is a view illustrating a second production scene, according to the inventive concept.

Figure 9:
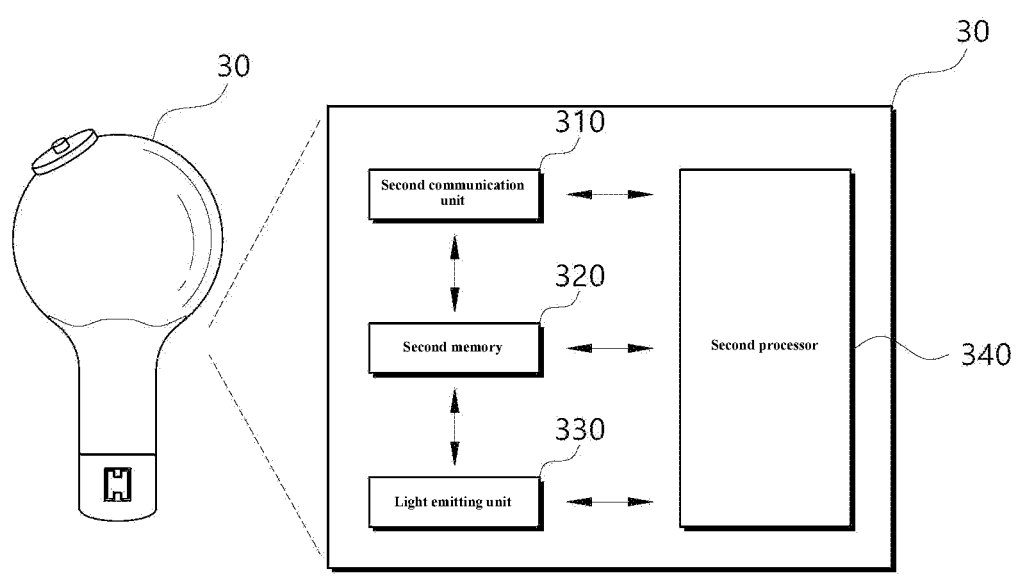
FIG. 9 is a block diagram illustrating the configuration of a light emitting device, according to the inventive concept.

FIG. 9 is a block diagram illustrating the configuration of the light emitting device 30, according to the inventive concept.

Hereinafter, the configuration and the operation of the control console device 10 and the light emitting device 30 in the performance producing system 1 according to the inventive concept, will be described while focusing on that the control console device 10 controls the light emitting device 30 positioned in one zone through one transmitter 20.

First, referring to FIG. 5, the control console device 10 may include a first communication unit 110, a first memory 120, and a first processor 130. Components illustrated in FIG. 5 are not necessary to implement the control console device 10. The control console device 10 described in the inventive concept may have components in number larger than or smaller than components described above.

The first communication unit 110 may include at least one module allowing wired or wireless communication with the transmitter 20, a wireless communication terminal (for example, a smartphone) (not illustrated) held by an audience, the light emitting device 30, or the data generator (not illustrated). In addition, the first communication unit 110 may include at least one module to connect the control console device 10 to at least one network.

The first memory 120 may be configured to include a cache or buffer, and may store data received or generated from the first processor 130 or the data generator (not illustrated). According to an embodiment, the first memory 120 may store data for producing performance, which is generated from the data generator (not illustrated).

The first processor 130 may generate a data packet corresponding to each production scene during the relevant performance producing duration, based on the data of producing the performance stored in the first memory 120, and may transmit the generated data packet to the transmitter 20. Alternatively, the first processor 130 may transmit the generated data packet to the light emitting device 30. In addition, the first processor 130 may operate the combination of at least two components included in the control console device 10.

In more detail, the first processor 130 may generate the data packet for the light emitting operation depending on the production scenes in performance, and may transmit the data packet in real time during the performance.

In this case, referring to FIG. 6, the data packet may include at least one pieces of information of index information 610, color palette information 620, and some group information 630.

First, the index information 610 may include some group information for at least one zone forming the first production scene.

In other words, the index information 610 may include position information of each of the first group information to the n-th group information, which is contained in the data packet, of some group information constituting the first production scene.

In more detail, the index information may include position information of each of the some group information constituting the portion of the scene, which is exhibited in a specific zone, of the first production scene. In this case, the position information of each of the some group information may indicate the position of the some group information in the data packet.

In other words, the index information 610 may include position information 611 of the first group information of some group information contained in the data packet for producing a portion of a scene produced in a specific zone of the first production scene to the position information of the n-th group information of the some group information contained in the data packet.

Next, the color palette information 620 may include color information for representing the first production scene.

In more detail, the color palette information 620 may arrange, in order of number, at least one piece of color information used for the first production scene. Accordingly, the light emitting device 30 may emit light in at least one color for each production scene, based on the color information to implement the production scene of the performance.

In other words, the color palette information may include the first color information 621, which is used for emitting light based on the first group information of some group information for constituting a portion of a scene produced in a specific zone of the first production scene, to N-th color information which is used for emitting light based on the N-th group information of the some group information.

Next, the some group information 630 may include color number information for each of some group information constituting the first production scene.

In more detail, the some group information may include number information of the color palette information on at least one color which is used in the first production scene.

In other words, the some group information may include number information 631 of the first color information, which is used for emitting light based on the first group information of some group information constituting a portion of a scene, which is produced in a specific zone, of the first production scene, to number information of the N-th color information which is used for emitting light based on the N-th group information of the some group information.

For example, referring to FIG. 7, the some group information constituting the first production scene may be information contained in a data packet for groups connected in various forms with respect to light emitting devices 30 positioned in a zone for the transmission of one transmitter 20, from among the whole group information constituting the first production scene.

When the performance hall is divided into zones A to H, the first production scene may be expressed with alphabet 'L' in the zone 'A', alphabet 'O' in zone 'B', alphabet 'V' in zone 'C', and alphabet 'E' in zone 'D', and may be expressed in half-heart patterns in zones 'E' and 'F', and zones 'G' and 'H', respectively.

In this case, when the control console device 10 transmits the data packet through one transmitter 20 connected to the zone 'A', the data packet may contain some group information for the zone 'A' forming the first production scene.

In detail, when the first production scene is produced, some group information for the zone 'A' may include first group information 701, second group information 702 to N-th group information, and the first group information 701, and the second group information 702 to N-th group information may be different from each other or may be bound in the same pattern, and the light emitting devices 30 defined as pixels included in each group information may be bound without overlap.

For another example, referring to FIG. 8, the some group information constituting the second production scene may be information on a data packet for groups connected in various forms with respect to light emitting devices 30 positioned in a zone for the transmission of one transmitter 20, from among the whole group information constituting the second production scene.

When the performance hall is divided into the zone A to the zone H, the second production scene may be expressed with the drawing of 'Smile' in the entire portion of the zone A to the zone H.

In this case, when the control console device 10 transmits the data packet through one transmitter 20 in the zone 'A', the data packet may contain some group information for zone 'A' constituting the second production scene different from the first production scene.

In detail, some group information for the zone 'A' may include first group information 801, and second group information 802 to N-th group information of FIG. 8, and the first group information 801, and second group information 802 to N-th group information may be different from each other or may be bound in the same pattern, and the light emitting devices 30 defined as pixels included in each group information may be bound without overlap.

Meanwhile, the first processor 130 may reduce the size, which is occupied in the data packet, of the color palette information and may transmit the color palette information to the light emitting device 30.

For example, the first processor 130 may compress R, G, and B, of a color, which is included in the color palette information, to 5 bits, 5 bits, and 5 bits instead of 8 bits, 8 bits, and 8 bits, respectively. In other words, the first processor 130 may reduce the depth of the color. For example, the first processor 130 may compress, for example, an 8-bit color to a 6-bit color to generate a data packet, thereby reducing the number of data packets, which are used to express a scene, to be transmitted.

For another example, the first processor 130 may define a color supported by the light emitting device 30 as an index color (for example, a 8-bit color) and store the defined color in the first memory 120. The first processor 130 may include a color, which is to be expressed, in the form of the value of the index color, in a color palette for transmission. Accordingly, the first processor 130 may reduce the size of the data packet by transmitting RGB data having 8 bits or less instead of RGB data fully having 24 bits. Accordingly, the first processor 130 may efficiently use the wireless bandwidth.

For another example, the first processor 130 may change similar colors, which are in each of the whole production scenes, into one unified color, and may apply a dithering scheme to each of the whole production scenes unified in one color, thereby reducing the size of the color palette information.

For another example, the first processor 130 may bind four pixels or six pixels in the preset range and process the pixels in one color, instead of transmitting all pixels, which are included in the data for producing the performance, with respect to a higher-resolution scene. Accordingly, the first processor 130 may generate a data packet such that the light emitting devices 30 matched to four pixels or six pixels in the present range emit light in the same color.

For another example, the first processor 130 may reduce the size of each data packet by synchronizing the first data packet including the index information and the some group information for the first production scene, and the second data packet including the color palette information, and may transmit the synchronization result.

For another example, when the first color palette information used for the first production scene is different from the second color palette information used for the second production scene, the first processor 130 may include only the second color palette information different from the first color palette information into the data packet and may transmit the data packet to the light emitting device 30.

Next, referring to FIG. 9, the light emitting device 30 may include a second communication unit 310, a second memory 320, a light emitting unit 330, and a second processor 340. Components illustrated in FIG. 9 are not components essentially necessary to implement the light emitting device 30. The light emitting device 30 described in the inventive concept may have components in number larger than or smaller than components described above.

In more detail, the second communication unit 310 of the components may include at least one module allowing wireless communication with the control console device 10, the transmitter 20 or a wireless communication terminal (for example, a smart phone)(not illustrated) held by an audience. In addition, the second communication unit 310 may include at least one module to connect the light emitting device 30 to at least one network.

The second communication unit 310 may communicate with various types of external devices depending on various types of communication schemes. The second communication unit 310 may include at least one of a Wi-Fi chip, a Bluetooth chip, a wireless communication chip, and an NFC chip.

According to the mobile communication technology of the present specification, a wireless signal is transmitted or received together with at least one of a base station, an external terminal or an external server over a mobile communication network constructed based on technical standards or communication schemes (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), or Long Term Evolution (LTE), Long Term Evolution-Advanced (LTE-A).

In addition, according to the present specification, the wireless communication technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

In addition, according to the present specification, the short-range communication technology may include the technology of supporting short-range communication by using at least one of Radio Frequency Identification (RFID), Bluetooth™, Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies.

The second memory 320 may be a local storage medium supporting various functions of the light emitting device 30. The second memory 320 may store a plurality of application programs (or applications) which are able to be driven in the light emitting device 30, and data and commands for the operation of the light emitting device 30. At least some of the application programs may be downloaded from an external server through wireless communication. The application program may be stored in the second memory 320, installed on the light emitting device 30 and driven to perform an operation (or function) of the light emitting device 30 by the second processor 340.

In addition, according to the inventive concept, the second memory 320 should retain data even when the power supplied to the light emitting device 30 is cut off, and may be provided as a writable non-volatile memory (Writable Rom) to reflect changes. In other words, the second memory 320 may include a flash memory or any one of EPROM or EEPROM. Although the inventive concept has been described in that information on all instructions is stored in the second memory 320 for the illustrative purpose, the inventive concept is not limited thereto. For example, the light emitting device 30 may include a plurality of memories.

In addition, according to the inventive concept, the second memory 320 may store control-related information such that the light emitting device 30 is controlled depending on the control of the bitmap.

In the inventive concept, the control-related information may include information to be necessarily stored in the second memory 320 such that the light emitting device 30 is controlled depending on the control of the bitmap. For example, the second memory 320 may store group information on each production scene to control the bitmap.

In addition, the second memory 320 may store seat information of tickets held by the audience. As a large number of crowds gather in the performance hall, a specific light emitting device may not correctly store control-related information for emitting light to correspond to a light emitting pattern. In this case, the specific light emitting device may need to be individually controlled by the control console device 10 until the correct control-related information is received. The control console device 10 may transmit a data packet, which controls only the specific light emitting device, through the transmitter 20.

Specifically, the seat information of the ticket stored in the second memory 320 may include at least one of seat information (for example, seat No. 1 in row A) displayed on the ticket, position information (for example, GPS information of a relevant seat) of the relevant seat, and identification information (for example, the left-uppermost seat of 50,000 seats is seat 1) of the relevant seat.

In this case, the control-related information may be input to the light emitting device 30 at a manufacturing stage of the light emitting device 30 or may be input through a terminal (e.g., a smart phone) of an audience holding the light emitting device 30 after the audience enters a performance hall.

The audience may electrically connect the terminal held by the audience to the light emitting device 30 to download control-related information for performance production from an external server through an application installed in the terminal and may store the control-related information in the second memory 320. The electrical connection may be made between the terminal and the light emitting device 30 through short-range wireless communication or mechanical connection.

In addition, according to an embodiment, the control-related information may be input during a ticket confirmation process before the user enters a performance hall. Specifically, the audience may perform a performance ticket confirmation stage before entering the performance hall. In this case, a performance staff may receive electronic code information included in the ticket through an information verification device (not shown) and may provide control-related information related to the position information corresponding to electronic code information to the light emitting device 30 and store the control-related information in the second memory 320. In this case, the information verification device may store the control-related information related to the position information in advance at the stage of planning a performance through the communication with the external server (not illustrated). The electronic code information may be obtained from information included in the notification (MMS, an e-mail, a push message of the application, etc.) received when an audience purchases a ticket from a terminal held by the audience.

In addition, the information verification device may include an electronic device such as a kiosk (not illustrated). In this case, the audience may personally perform the stage of verifying the performance ticket through the kiosk. The kiosk may receive the electronic code information included in the ticket, and may provide the control-related information related to the position information corresponding to the electronic code information to the light emitting device 30, such that the control-related information is stored in the second memory 320. In this case, the kiosk may store the control-related information related to the position information in advance at the stage of planning a performance through the communication with the external server (not illustrated).

In this case, the above-described control-related information may be information included in the data for producing the performance.

The light emitting unit 330 may include at least one light source. The light source may include, for example, a light emitting diode (LED). In addition, the light emitting unit 330 may output light in various colors based on RGB color by using the light source.

The second processor 340 may receive the data packet from the control console device 10 and perform the light emitting operation, which is contained in the data packet. In addition, the second processor 340 may operate the combination of at least two components included in the light emitting device 30.

The second processor 340 may allow the light emitting device 30 to emit light in a first color corresponding to first group information on the first production scene, which is contained in the data packet, based on group information on each production scene which is previously stored.

In more detail, the second processor 340 may determine number information of a first color, which corresponds to the first group information of the some group information, based on the position information of the first group information in the data packet. The second processor 340 may determine the first color information, which corresponds to the first color number information, of the color palette information, and emit the first color corresponding to the identified first color information through the light emitting unit 330.

In addition, the second processor 340 may temporarily store first color palette information in the received data packet. When the second color palette information in the received data packet is different from the previously stored first color palette information, the second processor 340 may update the first color pallet information with the second color palette information.

Figure 10:
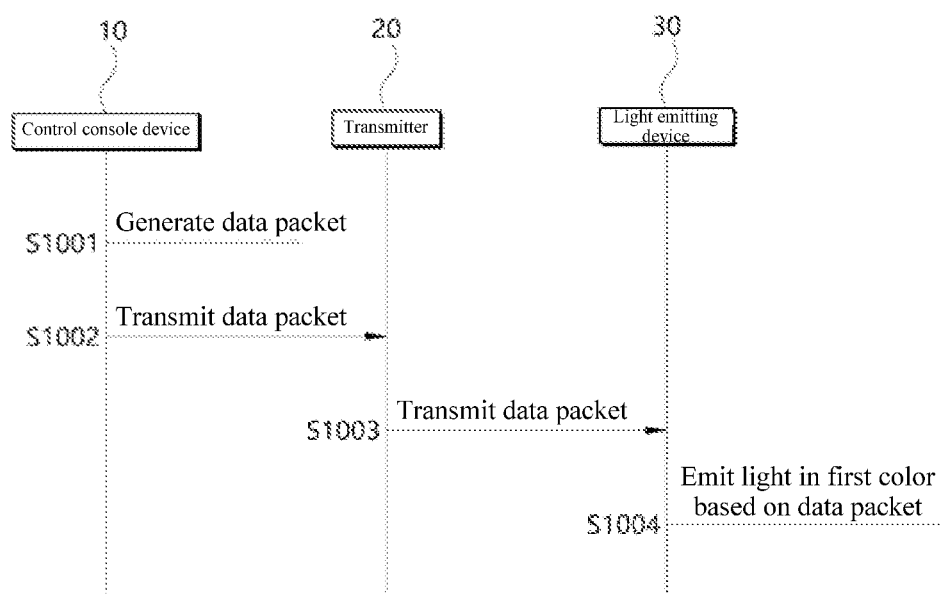
FIG. 10 is a flowchart illustrating a process for producing a performance scene in a performance hall, according to the inventive concept.

FIG. 10 is a flowchart illustrating a process for producing a performance scene in a performance hall, according to the inventive concept.

According to the inventive concept, the steps in the process for producing the production scene in the performance hall may be performed by the performance producing system 1 including the control console device 10, the transmitter 20, and the light emitting device 30.

The following description will be made with reference to FIG. 10, while focusing on the process of producing the production scene by the control console device 10, the transmitter 20, and the light emitting device 30.

Embodiments described with respect to the control console device 10, the transmitter 20, and the light emitting device 30 are at least partially or totally applicable to the method for producing the performance. In addition, the description of the method for producing the performance is at least partially or totally applicable to the description of the control console device 10, the transmitter 20, and the light emitting device 30. In addition, the process of producing the production scene according to the inventive concept is performed by the control console device 10, the transmitter 20, and the light emitting device 30 disclosed in the present specification, but the inventive concept is not limited thereto. Accordingly, the process may be performed by various types of electronic devices.

First, the control console device 10 may generate a data packet for a light emitting operation for each production scene of a performance, based on the stored data for producing the performance (S1001).

The data of producing the performance may be generated by the data generator (not illustrated) or the external server (not illustrated) at the stage of planning the performance. In addition, the control console device 10 may receive the data for producing the performance data in real time during a performance and may generate a data packet corresponding to the data.

In detail, the data generator (not illustrated) may map multiple pieces of group information, which is generated with respect to each performance producing duration (the scene for producing the performance), to audience seat information, and the mapped information may include the data for producing the performance during each performance producing duration.

For example, the data generator (not illustrated) may form data for producing the performance, which is obtained by mapping a plurality of groups corresponding to producing information during each duration. In this case, the data for producing the performance may include information on a scene produced during a performance time, depending on a seating chart of the performance. In other words, the light emitting devices 30 having the same group information during each performance producing duration may have the same light emitting state information. In addition, the light emitting devices 30 having the same group information may be changed depending on the performance producing duration. For example, the light emitting device having the first group information during the first performance producing duration (the first performance production scene) may be set to have second group information during the second performance producing duration (the second performance production scene). In other words, a light emitting devices belonging to the first group during the first performance producing duration (the first performance production scene) may be different from a light emitting device belonging to a group during the second performance producing duration (the second performance production scene).

The control console device 10 may control the light emitting device 30, which is positioned to correspond to each seat in the performance hall, by using the data for producing the performance as described above, in the form of a bitmap, and may generate a data packet for the control operation.

Next, the control console device 10 may transmit the data packet to the transmitter 20 (S1002).

The control console device 10 may transmit the data packet, which is to be transmitted by each transmitter, to the transmitter 20. In this case, the data packet transmitted to each transmitter may be the same data packet or may be varied depending on transmitters.

The transmitter 20 may transmit the data packet, which is received from the control console device 10, to the light emitting device 30 (S1003).

The light emitting device 30 may receive the data packet from the control console device 10 and perform a light emitting operation, which is contained in the data packet (S1004).

In this case, group information representing the group to which the light emitting device 30 belongs with respect to each production scene, may be stored, in advance, in the light emitting device 30 before the performance is produced. For example, the light emitting device 30 may receive and store the group information for controlling a bitmap through an application program or an application installed in the information verifying device (for example, kiosk) or a terminal held by an audience. In other words, the group information of the light emitting device 30 may be input and stored through the kiosk at the stage of verifying the ticket, or may be input and stored through an application of the wireless communication terminal held by the audience.

In this case, the light emitting state information (for example, the color information using RGB) may be excluded from the information previously stored. The group information may indicate the group of light emitting devices 30 controlled to be in the same color at a specific event or a specific scene.

In detail, the light emitting device 30 may receive the data packet from the transmitter 20, may compare identification information of the transmitter 20, which is included in the data packet, with identification information of the transmitter, which is previously stored, thereby verifying the identification information of the transmitter.

Accordingly, when the light emitting device 30 compares the previously-stored identification information of the transmitter with the identification information of the transmitter 20, which is included in the received data packet, and the previously-stored identification information is identical to the identification information of the received data packet, the light emitting device 30 may emit light in a color corresponding to group information for each production scene, which is included in the received data packet.

Although FIG. 10 illustrates that steps S1001 to S1004 are sequentially performed, this is merely provided for the explanation of a technical spirit of the present embodiments. Those skilled in the art to which the present embodiment pertains may perform the steps by changing the above sequence illustrated in FIG. 10 or perform at least one of steps S1001 to step S1004 in parallel without departing from the technical scope of the present embodiment. In addition, variations and modification of the present embodiments are possible. Accordingly, FIG. 10 is not limited to a time-series sequence.

According to the inventive concept, the process of producing the production scene may be implemented in the form of software including at least one instruction stored in a machine-readable storage medium (for example, a memory). For example, the processor (for example, the processor 130 or 340) of the device may call at least one instruction of one or more instructions from the storage medium and may execute the at least one instruction. This allows the machine to run to perform at least one function according to the at least one instruction, which is called. The one or more instructions may include a code generated by a compiler or a code executable by an interpreter. The machine-readable storage medium may be provided in the form of a non-transitory storage medium. Here, the term "non-transitory storage medium", as used herein, means that the storage medium is tangible, but does not include a signal (for example, an electromagnetic wave). The term "non-transitory" does not differentiate a case where the data is permanently stored in the storage medium from a case where the data is temporally stored in the storage medium. For example, the "non-transitory storage medium" may include a buffer in which data is temporarily stored.

The above-described process of producing the production scene may be included in a computer program product and provided. The computer program product may be traded as goods between a seller and a buyer. The computer program product may be distributed in the form of machine-readable storage medium (for example, a compact disc read only memory (CD-ROM)) or may be directly distributed (for example, download or upload) online through an application store (for example, a Play Store™) or between two user devices (for example, the smartphones). In the case of online distribution, at least a portion of the computer program product (for example, a downloadable app) may be temporarily stored or generated in a machine-readable storage medium such as a memory of a manufacturer's server, an application store's server, or a relay server. Although an embodiment of the inventive concept are described with reference to the accompanying drawings, it will be understood by those skilled in the art to which the inventive concept pertains that the inventive concept can be carried out in other detailed forms without changing the scope and spirit or the essential features of the inventive concept. Therefore, the embodiments described above are provided by way of example in all aspects, and should be construed not to be restrictive.

Although an embodiment of the inventive concept are described with reference to the accompanying drawings, it will be understood by those skilled in the art to which the inventive concept pertains that the inventive concept can be carried out in other detailed forms without changing the scope and spirit or the essential features of the inventive concept. Therefore, the embodiments described above are provided by way of example in all aspects, and should be construed not to be restrictive.

As described above, according to the inventive concept, one light emitting device may be designated as one pixel in the bitmap, and the plurality of light emitting devices may be controlled in a manner of controlling the pixel in the bitmap, when the performance is produced in the performance hall, thereby providing the scene effectively produced.

In addition, according to the inventive concept, when the performance is produced in the performance hall, the data packet is transmitted to the light emitting device from the control console in real time, thereby changing the light emitting state of the light emitting device in real time. Accordingly, scenes various produced may be provided depending on situations.

Problems to be solved by the inventive concept are not limited to the problems mentioned above, and other problems not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A system for controlling a bitmap to produce a performance scene, the system comprising:
   a control console device configured to generate and transmit a data packet for a light emitting operation with respect to each of production scenes for a performance; and
   a plurality of light emitting devices configured to receive the data packet from the control console device and to perform the light emitting operation in the data packet,
   wherein the light emitting device emits light in a first color corresponding to first group information for a first production scene, which is contained in the data packet, based on group information for the production scene which is previously stored, wherein the data packet includes at least one of index information including some group information constituting the first production scene, color palette information including color information for representing the first production scene, and some group information including color number information for each of the some group information constituting the first production scene, and wherein the index information includes position information of the first group information, which is contained in the data packet, of the some group information constituting the first production scene.

2. The system of claim 1, wherein the light emitting device determines number information of the first color, which corresponds to the first group information of the some group information, based on the position information of the first group information, determines first color information, which corresponds to the first color number information, of the color palette information, and emits the light in the first color corresponding to the determined first color information.

3. The system of claim 1, wherein the control console device changes similar colors of each of the whole production scenes into one unified color, applies a dithering scheme to each of the whole production scenes unified in one color, and reduces a size of the color palette information.

4. The system of claim 1, wherein the control console device synchronizes a first data packet including the index information and the some group information for the first production scene with a second data packet including the color palette information, and transmits the synchronization result.

5. The system of claim 1, wherein the light emitting device for a cheering rod temporarily stores first color palette information in the received data packet, and updates the first color pallet information with second color palette information, when the second color palette information in the received data packet is different from the first color palette information which is previous stored.

6. A light emitting device to produce a production scene, the light emitting device comprising:
   a communication unit configured to communicate with a control console device;
   a light emitting unit configured to emit light using a light source;
   a storage unit configured to store data; and
   a control unit configured to control an operation of the light emitting device, wherein the control unit is configured to:
   control the light emitting device to emit light in a first color corresponding to first group information for a first production scene, which is contained in a data packet received from the control console device through the communication unit, based on group information for each production scene which is stored in the storage unit,
   wherein the data packet includes at least one of index information including some group information constituting the first production scene, color palette information including color information for representing the first production scene, and some group information including color number information for each of the some group information constituting the first production scene, and
   wherein the index information includes position information of the first group information, which is contained in the data packet, of the some group information constituting the first production scene.

7. A method for a control operation performed in a system for controlling a bitmap to produce a performance scene, the system including a control console device and a plurality of light emitting devices, the method comprising:
   generating and transmitting, by the control console device, a data packet for a light emitting operation with respect to each of production scenes for a performance; and
   receiving, by the plurality of light emitting devices, the data packet from the control console device and performing the light emitting operation in the data packet,
   wherein the light emitting device emits light in a first color corresponding to first group information for a first production scene, which is contained in the data packet, based on group information for the production scene which is previously stored,
   wherein the data packet includes at least one of index information including some group information constituting the first production scene, color palette information including color information for representing the first production scene, and some group information including color number information for each of the some group information constituting the first production scene, and
   wherein the index information includes position information of the first group information, which is contained in the data packet, of the some group information constituting the first production scene.

8. The method of claim 7 wherein the light emitting device determines number information of the first color, which corresponds to the first group information of the some group information, based on the position information of the first group information, determines first color information, which corresponds to the first color number information, of the color palette information, and emits the light in the first color corresponding to the determined first color information.

9. The method of claim 7, wherein the control console device changes similar colors of each of whole production scenes into one unified color, applies a dithering scheme to each of the whole production scenes unified in one color, and reduces a size of the color palette information.

10. The method of claim 7, wherein the control console device synchronizes a first data packet including the index information and the some group information for the first production scene, with a second data packet including the color palette information, and transmits the synchronization result.

11. The method of claim 7, wherein the light emitting device for a cheering rod temporarily stores first color palette information in the received data packet, and updates the first color pallet information with second color palette information, when the second color palette information in the received data packet is different from the first color palette information which is previous stored.

* * * * *